(12) United States Patent
Kautzsch et al.

(10) Patent No.: US 8,471,346 B2
(45) Date of Patent: Jun. 25, 2013

(54) SEMICONDUCTOR DEVICE INCLUDING A CAVITY

(75) Inventors: Thoralf Kautzsch, Dresden (DE); Markus Rochel, Radebeul (DE)

(73) Assignee: Infineon Technologies AG, Neubiberg (DE)

(*) Notice: Subject to any disclaimer, the term of this patent is extended or adjusted under 35 U.S.C. 154(b) by 875 days.

(21) Appl. No.: 12/394,836

(22) Filed: Feb. 27, 2009

(65) Prior Publication Data
US 2010/0218613 A1    Sep. 2, 2010

(51) Int. Cl.
*G01L 7/08*    (2006.01)

(52) U.S. Cl.
USPC ........... 257/415; 73/715; 73/724; 73/725; 73/727; 257/414; 257/417; 257/419; 257/E21.002; 257/E21.54; 257/E21.55; 438/48; 438/50; 438/53; 438/439; 361/283.1; 361/283.4

(58) Field of Classification Search
USPC .......... 73/715, 718, 719, 720, 724, 727, 73/754; 257/414, 415, 417, 419, E21.002, 257/E21.54, E21.55, 522, E23.013, E21.564, 257/E21.573, E21.581; 438/48, 50, 53, 439, 438/319, 411, 422; 361/283.1, 283.4
See application file for complete search history.

(56) References Cited

U.S. PATENT DOCUMENTS

| | | | |
|---|---|---|---|
| 4,356,211 A * | 10/1982 | Riseman | 438/422 |
| 4,906,586 A * | 3/1990 | Blackburn | 438/53 |
| 5,343,064 A | 8/1994 | Spangler et al. | |
| 5,350,941 A | 9/1994 | Madan | |
| 5,659,196 A | 8/1997 | Honda | |
| 5,721,174 A * | 2/1998 | Peidous | 438/445 |
| 6,012,336 A * | 1/2000 | Eaton et al. | 73/754 |
| 6,229,190 B1 | 5/2001 | Bryzek et al. | |
| 6,268,267 B1 | 7/2001 | Lin | |
| 6,653,702 B2 | 11/2003 | Ishio et al. | |
| 6,704,185 B2 | 3/2004 | Chatzandroulis et al. | |
| 7,207,227 B2 | 4/2007 | Rangsten et al. | |
| 7,402,449 B2 | 7/2008 | Fukuda et al. | |
| 7,622,782 B2 * | 11/2009 | Chu et al. | 257/415 |
| 7,811,896 B2 * | 10/2010 | Gogoi | 438/422 |
| 2006/0148207 A1 | 7/2006 | Kim | |
| 2007/0164379 A1 | 7/2007 | Brown et al. | |
| 2007/0246831 A1 * | 10/2007 | Gabric et al. | 257/758 |
| 2008/0174017 A1 * | 7/2008 | Yang et al. | 257/751 |
| 2008/0178681 A1 | 7/2008 | Asada et al. | |

* cited by examiner

*Primary Examiner* — David Vu
*Assistant Examiner* — Sitaramarao S Yechuri
(74) *Attorney, Agent, or Firm* — Dicke, Billig & Czaja, PLLC (57) ABSTRACT

A semiconductor device includes a substrate including a cavity and a first material layer over at least a portion of sidewalls of the cavity. The semiconductor device includes an oxide layer over the substrate and at least a portion of the sidewalls of the cavity such that the oxide layer lifts off a top portion of the first material layer toward a center of the cavity.

25 Claims, 7 Drawing Sheets

SEMICONDUCTOR DEVICE INCLUDING A CAVITY

CROSS-REFERENCE TO RELATED APPLICATIONS

This Utility Patent Application is related to U.S. patent application Ser. No. 12/208,897, entitled "SEMICONDUCTOR DEVICE INCLUDING A PRESSURE SENSOR", filed Sep. 11, 2008, which is incorporated herein by reference.

BACKGROUND

Pressure sensors are typically used to measure the pressure of a liquid or a gas, such as air. Pressure sensors typically provide an output signal that varies based on the pressure sensed by the pressure sensor. One type of pressure sensor includes a stand-alone pressure sensor that is coupled to or bonded to a sensor circuit, such as an application-specific integrated circuit (ASIC). This type of pressure sensor is expensive to fabricate. Connecting this type of pressure sensor to a sensor circuit is also expensive. Another type of pressure sensor is a pressure capsule (e.g., a polysilicon plate) that is integrated with a sensor circuit, such as an ASIC, during a back-end-of-line (BEOL) process. This type of pressure sensor is also expensive to produce since several additional mask levels are used to fabricate the pressure sensor and the pressure sensor uses a significant amount of space of the ASIC.

For these and other reasons, there is a need for the present invention.

SUMMARY

One embodiment provides a semiconductor device. The semiconductor device includes a substrate including a cavity and a first material layer over at least a portion of sidewalls of the cavity. The semiconductor device includes an oxide layer over the substrate and at least a portion of the sidewalls of the cavity such that the oxide layer lifts off a top portion of the first material layer toward a center of the cavity.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
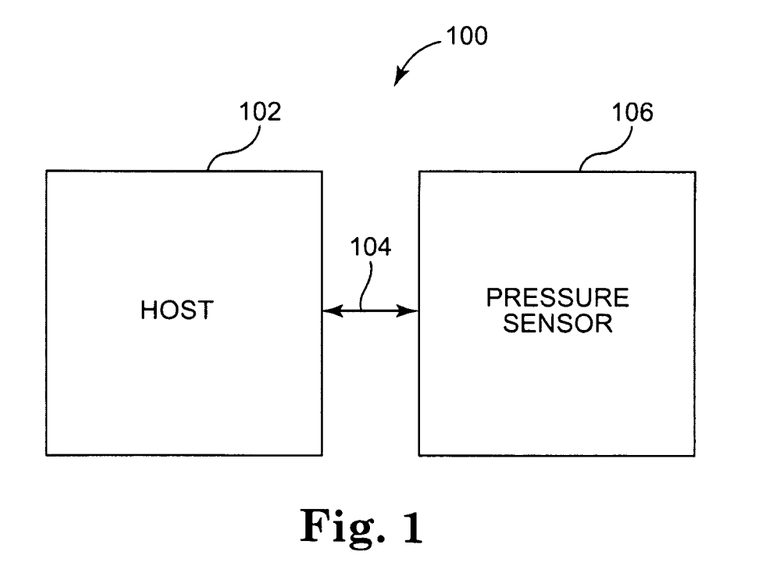
FIG. 1 is a block diagram illustrating one embodiment of a system.

FIG. 1 is a block diagram illustrating one embodiment of a system 100. System 100 includes a host 102 and a pressure sensor 106. Host 102 is communicatively coupled to pressure sensor 106 through communication link 104. Host 102 includes a microprocessor, computer, controller, or any other suitable device for receiving data from pressure sensor 106. Pressure sensor 106 communicates pressure data to host 102 though communication link 104. In one embodiment, communication link 104 is a wireless communication link.

In one embodiment, pressure sensor 106 is integrated in an ultra low-cost single chip in a complementary metal-oxide-semiconductor (CMOS) process including a local oxidation of silicon (LOCOS) process. In one embodiment, pressure sensor 106 includes a first cavity parallel to a second cavity and a pressure sensitive longitudinal lamella between the first and second cavities. The first cavity is a buried cavity, and the second cavity is open to the atmosphere. As used herein, the atmosphere may include a gas or a liquid. The buried cavity is formed using an LOCOS process. To form the buried cavity, a top portion of a nitride, oxynitride, or other suitable material layer deposited on sidewalls of the cavity is lifted off during a thermal oxidation process to seal or narrow the opening to the cavity.

Pressure sensor 106 includes sensor elements for sensing pressure within the second cavity on the lamella. The sensor elements can include capacitive elements, stress sensitive transistors, piezo resistor elements, or other suitable sensor elements. In one embodiment, pressure sensor 106 includes an array of vertical sensor cavities and associated sensor elements to increase sensitivity and reliability. Pressure sensor 106 consumes a minimal area and in one embodiment is integrated as part of an application-specific integrated circuit (ASIC).

Figure 2:
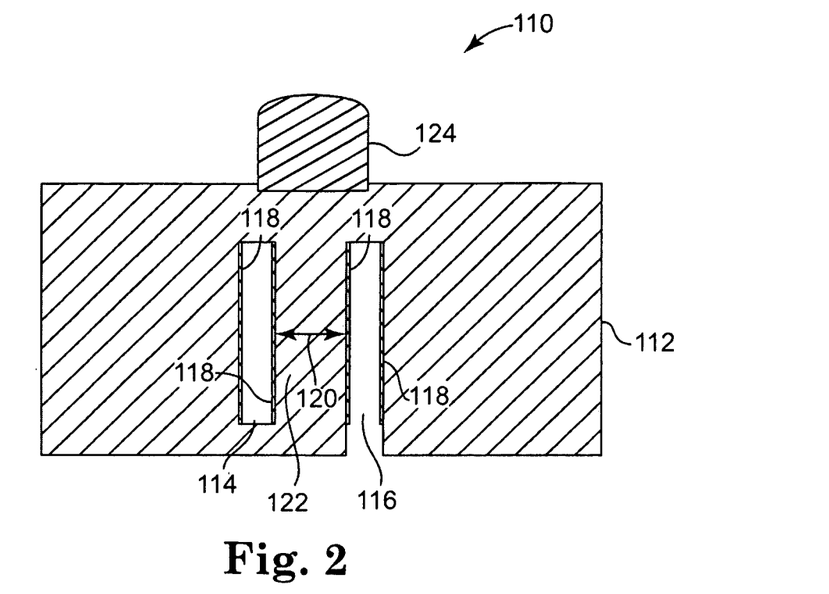
FIG. 2 illustrates a cross-sectional view of one embodiment of a pressure sensor.

FIG. 2 illustrates a cross-sectional view of one embodiment of a pressure sensor 110. In one embodiment, pressure sensor 110 provides pressure sensor 106 previously described and illustrated with reference to FIG. 1. Pressure sensor 110 includes a substrate 112, a first cavity 114, a second cavity 116, capacitive sensor elements 118, a lamella 122, and a logic device 124. Substrate 112 includes a silicon substrate or another suitable substrate.

First cavity 114 is oriented vertically within substrate 112 and completely buried within or enclosed by substrate 112. In one embodiment, first cavity 114 is formed using a thermal oxidation or LOCOS process, which will be described below with reference to FIGS. 7-13. Second cavity 116 is also oriented vertically within substrate 112 and is open to the atmosphere. In one embodiment, second cavity 116 is open to the atmosphere on the backside of substrate 112. First cavity 114 is parallel to second cavity 116 such that lamella 122 is defined between first cavity 114 and second cavity 116. Lamella 122 is sensitive to pressure and deflects based on the pressure within second cavity 116. The sensitivity of pressure sensor 110 is based on the lamella material, the lamella thickness, and the amount of overlap of first cavity 114 and second cavity 116.

Capacitive sensor elements 118 are formed on the sidewalls of first cavity 114 and second cavity 116. In one embodiment, capacitive sensor elements 118 are formed by doping the sidewalls of first cavity 114 and second cavity 116. In response to a change in pressure on lamella 122 as indicated at 120, the distance between sensor elements 118 and therefore the capacitance of sensor elements 118 changes. In this way, the capacitance of sensor elements 118 provides an indication of the pressure within second cavity 116. In one embodiment, a logic device 124 or logic devices are coupled to capacitive sensor elements 118 to measure the capacitance and provide an output indicating the pressure on lamella 122.

Figure 3:
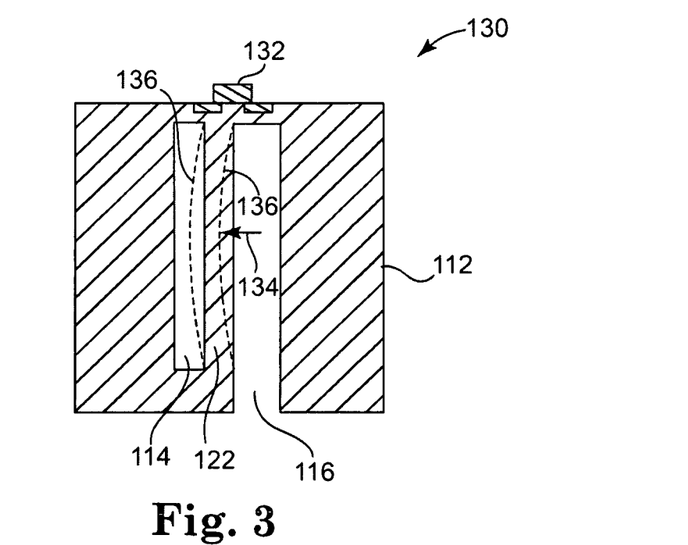
FIG. 3 illustrates a cross-sectional view of another embodiment of a pressure sensor.

FIG. 3 illustrates a cross-sectional view of another embodiment of a pressure sensor 130. In one embodiment, pressure sensor 130 provides pressure sensor 106 previously described and illustrated with reference to FIG. 1. Pressure sensor 130 includes substrate 112, first cavity 114, second cavity 116, lamella 122, and a stress sensitive transistor 132. In one embodiment, stress sensitive transistor 132 includes a stress sensitive metal-oxide-semiconductor field-effect transistor (MOSFET) or another suitable stress sensitive transistor. In one embodiment, first cavity 114 is formed using a thermal oxidation or LOCOS process, which will be described below with reference to FIGS. 7-13.

In this embodiment, pressure from the atmosphere within second cavity 116 as indicated at 134 deflects lamella 122 as indicated at 136. The current through stress sensitive transistor 132 varies based on the deflection of lamella 122. In this way, the current through stress sensitive transistor 132 provides an indication of the pressure within second cavity 116.

Figure 4:
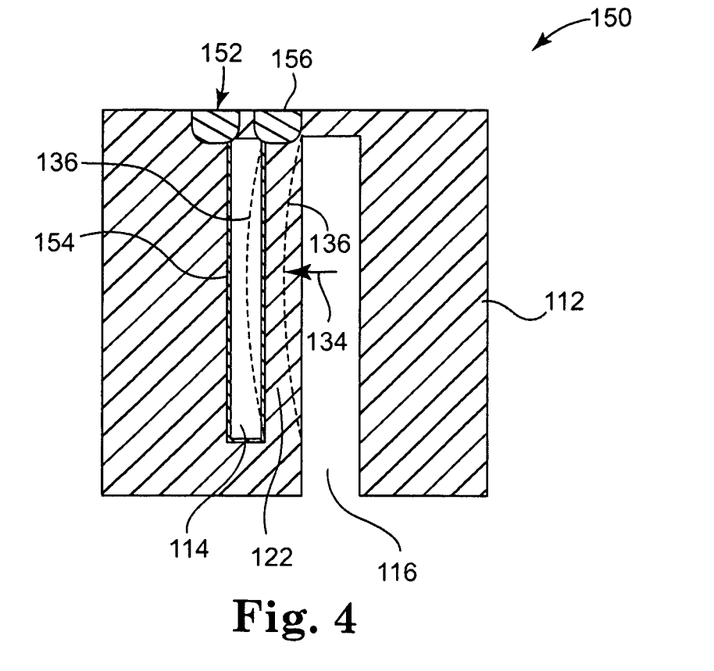
FIG. 4 illustrates a cross-sectional view of another embodiment of a pressure sensor.

FIG. 4 illustrates a cross-sectional view of another embodiment of a pressure sensor 150. In one embodiment, pressure sensor 150 provides pressure sensor 106 previously described and illustrated with reference to FIG. 1. Pressure sensor 150 includes substrate 112, first cavity 114, second cavity 116, lamella 122, and a piezo resistor 152. In one embodiment, first cavity 114 is formed using a thermal oxidation or LOCOS process, which will be described below with reference to FIGS. 7-13. As indicated at 154, piezo resistor 152 is formed on the sidewalls and bottom of first cavity 114 via doping or another suitable method. Piezo resistor 152 also includes contacts 156 for electrically coupling piezo resistor 152 to a sensing circuit.

In this embodiment, pressure from the atmosphere within second cavity 116 as indicated at 134 deflects lamella 122 as indicated at 136. The resistance of piezo resistor 152 varies based on the deflection of lamella 122. In this way, the resistance of piezo resistor 152 provides an indication of the pressure within second cavity 116.

Figure 5:
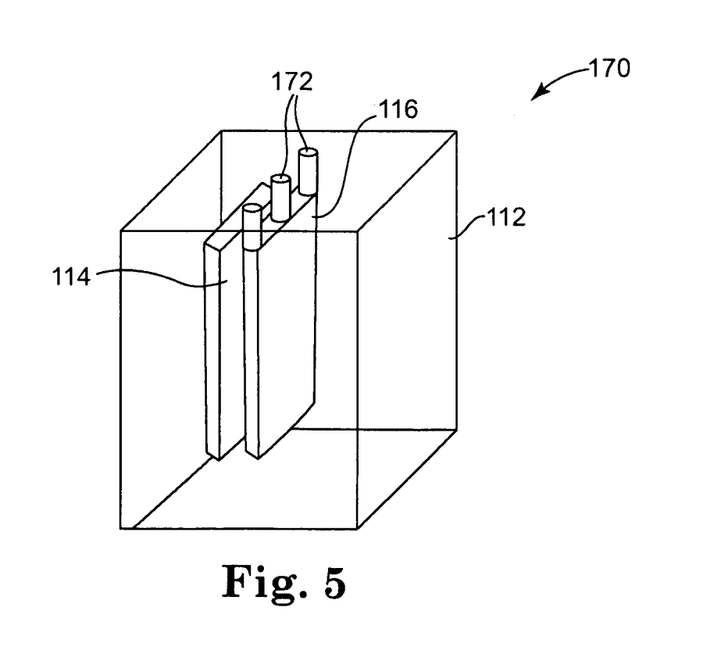
FIG. 5 is a diagram illustrating another embodiment of a pressure sensor.

FIG. 5 is a diagram illustrating another embodiment of a pressure sensor 170. In one embodiment, pressure sensor 170 provides pressure sensor 106 previously described and illustrated with reference to FIG. 1. Pressure sensor 170 includes substrate 112, first cavity 114, second cavity 116, and sensor elements (not shown). In this embodiment, second cavity 116 is open to the atmosphere on the front side of substrate 112 as indicated at 172. Pressure sensor 170 can include capacitive sensor elements as previously described and illustrated with reference to FIG. 2, stress sensitive transistor sensor elements as previously described and illustrated with reference to FIG. 3, piezo resistor sensor elements as previously described and illustrated with reference to FIG. 4, or other suitable sensor elements. In one embodiment, first cavity 114 and/or second cavity 116 are formed using a thermal oxidation or LOCOS process, which will be described below with reference to FIGS. 7-13.

Figure 6:
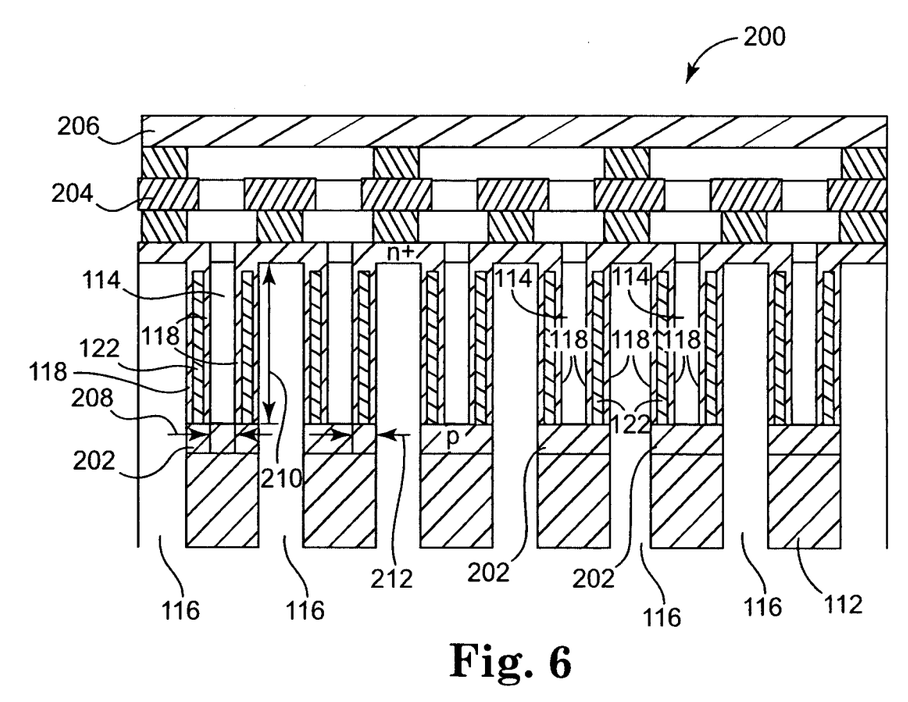
FIG. 6 illustrates a cross-sectional view of another embodiment of a pressure sensor.

FIG. 6 illustrates a cross-sectional view of another embodiment of a pressure sensor 200. In one embodiment, pressure sensor 200 provides pressure sensor 106 previously described and illustrated with reference to FIG. 1. Pressure sensor 200 is similar to pressure sensor 110 previously described and illustrated with reference to FIG. 2, except that pressure sensor 200 includes an array of cavities and associated sensor elements.

Pressure sensor 200 includes substrate 112, a plurality of first cavities 114, a plurality of second cavities 116, a plurality of capacitive sensor elements 118, a plurality of lamellas 122, a first metallization layer 204, and a second metallization layer 206. In one embodiment, each of first cavities 114 is formed using a thermal oxidation or LOCOS process, which will be described below with reference to FIGS. 7-13. In this embodiment, capacitive sensor elements 118 are formed by n+ type doping of substrate 112. Capacitive sensor elements 118 are isolated from each other by p type doping of substrate 112 to provide p type doped regions 202. In another embodiment, capacitive sensor elements 118 are formed by p+ type doping of substrate 112 and are isolated from each other by n+ type doping of substrate 112 to provide n+ type doped regions 202. First metallization layer 204 and second metallization layer 206 are electrically coupled to capacitive sensor elements 118 to provide sense signals from capacitive sensor elements 118 to a sensor circuit. In other embodiments, capacitive sensor elements 118 are replaced with stress sensitive transistors, piezo resistors, or other suitable sensing elements for sensing the pressure on lamellas 122 due to pressure within second cavities 116.

In one embodiment, the width of each first cavity 114 as indicated at 208 is between approximately 50 nm and 150 nm. The height of each first cavity 114 as indicated at 210 is between approximately 2 μm and 15 μm. The width of each lamella 122 as indicated at 212 is between approximately 100 nm and 500 nm. In other embodiments, other suitable dimensions are used to provide the desired sensitivity and working range.

Pressure sensor 200 can include any suitable number of cavities and associated sensor elements, such as 10, 20, or another suitable number. By including multiple cavities and associated sensor elements, the sensitivity of the pressure sensor can be increased. In addition, if one or more of the cavities becomes blocked or if one or more of the sensor elements fail, the remaining cavities and associated sensor elements can still sense the pressure and provide an output indicating the pressure, thereby increasing the reliability of the pressure sensor.

The following FIGS. 7-13 illustrate embodiments of a method for fabricating a cavity within a substrate. In one embodiment, the cavity is used in the fabrication of a pressure sensor, such as pressure sensor 110 previously described and illustrated with reference to FIG. 2, pressure sensor 130 previously described and illustrated with reference to FIG. 3, pressure sensor 150 previously described and illustrated with reference to FIG. 4, pressure sensor 170 previously described and illustrated with reference to FIG. 5, pressure sensor 200 previously described and illustrated with reference to FIG. 6, or other suitable sensor utilizing a cavity. In another embodiment, the cavity replaces a dielectric material and is used to electrically isolate circuits within a semiconductor device from each other.

Figure 7:
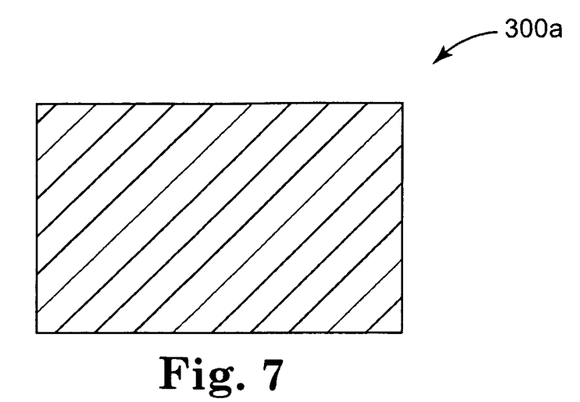
FIG. 7 illustrates a cross-sectional view of one embodiment of a semiconductor substrate.

FIG. 7 illustrates a cross-sectional view of one embodiment of a substrate 300a. Substrate 300a includes a silicon substrate or another suitable semiconductor substrate.

Figure 8:
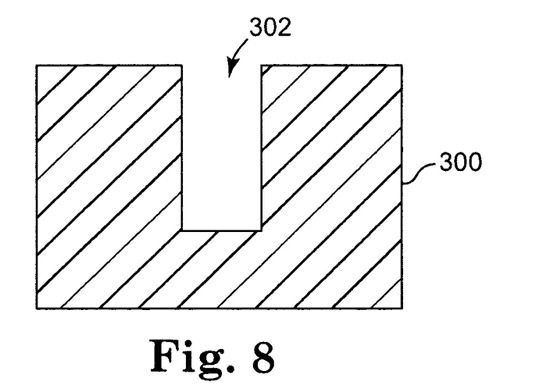
FIG. 8 illustrates a cross-sectional view of one embodiment of the semiconductor substrate including a trench.

FIG. 8 illustrates a cross-sectional view of one embodiment of semiconductor substrate 300 including a trench 302. A portion of semiconductor substrate 300a is etched to provide an opening or trench 302 in semiconductor substrate 300. In one embodiment, trench 302 has a width within a range between approximately 50 nm and 250 nm. In one embodiment, trench 302 has a depth within a range between approximately 2 μm and 15 μm.

Figure 9:
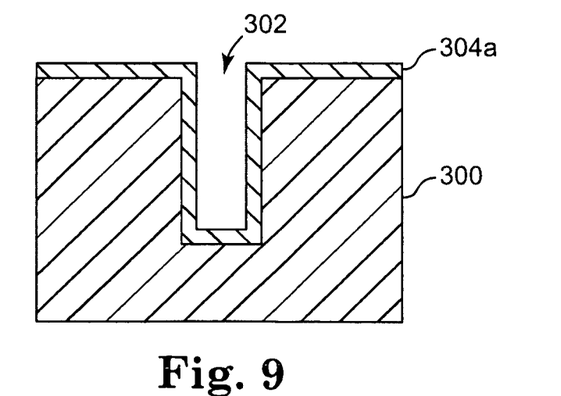
FIG. 9 illustrates a cross-sectional view of one embodiment of the semiconductor substrate and a nitride or oxynitride layer.

FIG. 9 illustrates a cross-sectional view of one embodiment of semiconductor substrate 300 and a nitride or oxynitride layer 304a. In one embodiment, a nitride or oxynitride is deposited over semiconductor substrate 300 including trench 302 to provide nitride or oxynitride layer 304a. In another embodiment, any suitable material that prevents oxygen diffusion through the material to semiconductor substrate 300 is deposited over semiconductor substrate 300 including trench 302 to provide layer 304a. Nitride or oxynitride layer 304a is deposited using chemical vapor deposition (CVD), low pressure chemical vapor deposition (LPCVD), high density plasma-chemical vapor deposition (HDP-CVD), atomic layer deposition (ALD), metal organic chemical vapor deposition (MOCVD), physical vapor deposition (PVD), jet vapor deposition (JVD), or other suitable deposition technique. In one embodiment, nitride or oxynitride layer 304a is deposited to a thickness within a range between approximately 30 nm and 90 nm.

Figure 10A:
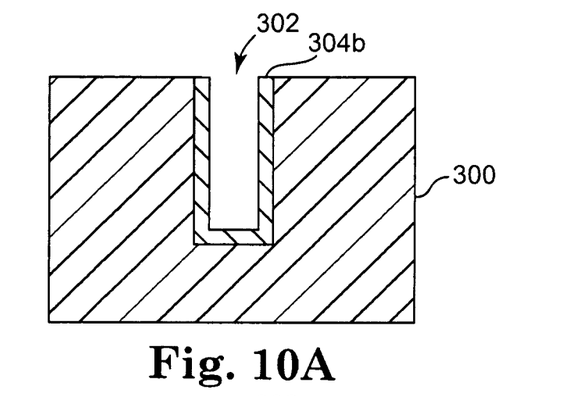
FIG. 10A illustrates a cross-sectional view of one embodiment of the semiconductor substrate and the nitride or oxynitride layer after etching the nitride or oxynitride layer.

FIG. 10A illustrates a cross-sectional view of one embodiment of semiconductor substrate 300 and nitride or oxynitride layer 304b after etching nitride or oxynitride layer 304a. Nitride or oxynitride layer 304a is etched to expose the top of semiconductor substrate 300 to provide nitride or oxynitride layer 304b on the sidewalls and bottom of trench 302. In this embodiment, due to the geometry of trench 302, nitride or oxynitride remains on the bottom of trench 302 after etching. In one embodiment, nitride or oxynitride layer 304b is back etched such that the top of nitride or oxynitride layer 304b is below the top of semiconductor substrate 300.

Figure 10B:
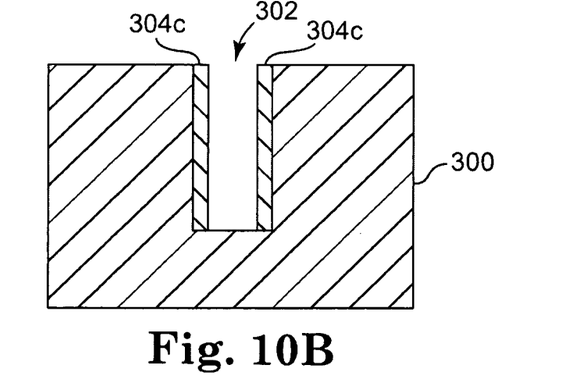
FIG. 10B illustrates a cross-sectional view of another embodiment of the semiconductor substrate and the nitride or oxynitride layer after etching the nitride or oxynitride layer.

FIG. 10B illustrates a cross-sectional view of another embodiment of semiconductor substrate 300 and nitride or oxynitride layer 304c after etching nitride or oxynitride layer 304a. Nitride or oxynitride layer 304a is spacer etched to expose the top of semiconductor substrate 300 and the bottom of trench 302 to provide nitride or oxynitride layer 304c on the sidewalls of trench 302. In this embodiment, due to the geometry of trench 302, nitride or oxynitride does not remain on the bottom of trench 302 after etching. In one embodiment, nitride or oxynitride layer 304c is back etched such that the top of nitride or oxynitride layer 304c is below the top of semiconductor substrate 300.

While the process described with reference to the following FIGS. 11 and 12 use nitride or oxynitride layer 304b previously described and illustrated with reference to FIG. 10A, nitride or oxynitride layer 304c previously described and illustrated with reference to FIG. 10B may be used in place of nitride or oxynitride layer 304b.

Figure 11:
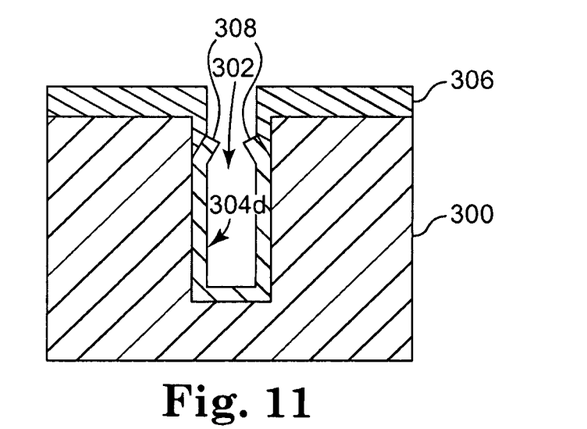
FIG. 11 illustrates a cross-sectional view of one embodiment of the semiconductor substrate, the nitride or oxynitride layer, and an oxide layer after oxidation.

FIG. 11 illustrates a cross-sectional view of one embodiment of semiconductor substrate 300, nitride or oxynitride layer 304d, and an oxide layer 306 after thermal oxidation. In this embodiment, nitride or oxynitride layer 304b has been back etched such that the top of the nitride or oxynitride layer is below the top of semiconductor substrate 300. A thermal oxidation or LOCOS process is then performed to oxidize the surface of semiconductor substrate 300. The oxidation process also oxidizes the upper sidewalls of trench 302 under nitride or oxynitride layer 304b. As such, the upper portion of nitride or oxynitride layer 304b is lifted from semiconductor substrate 300 and forced toward the center of trench 302 to provide nitride or oxynitride layer 304d including lifted portions 308. In one embodiment, lifted portions 308 contact each other and seal trench 302 to provide a cavity. In another embodiment, lifted portions 308 do not completely seal the cavity but narrow the opening of trench 302.

Figure 12:
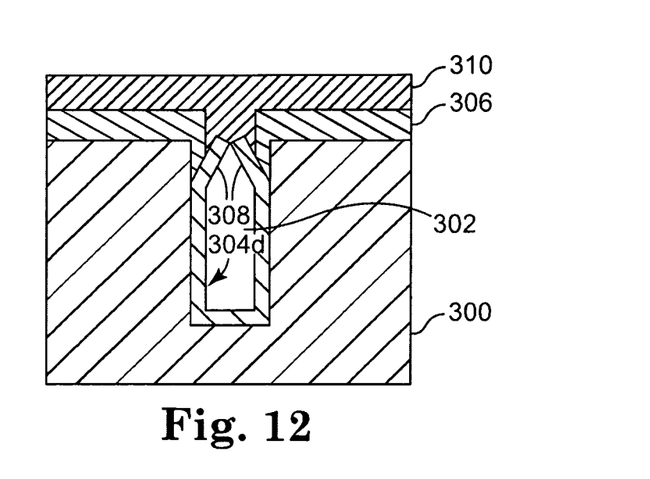
FIG. 12 illustrates a cross-sectional view of one embodiment of the semiconductor substrate, the nitride or oxynitride layer, the oxide layer, and a dielectric layer.

FIG. 12 illustrates a cross-sectional view of one embodiment of semiconductor substrate 300, nitride or oxynitride layer 304d, oxide layer 306, and a dielectric layer 310. In this embodiment, lifted portions 308 of nitride or oxynitride layer 304d contact each other to seal trench 302. In one embodiment, air is trapped within trench 302. In another embodiment, trench 302 comprises a vacuum. In one embodiment, an oxide, such as TEOS, or another suitable dielectric material is deposited over exposed portions of oxide 306 and lifted portions 308 of nitride or oxynitride layer 304d to provide dielectric layer 310. In another embodiment, oxide 306 is removed prior to depositing dielectric layer 310. Dielectric layer 310 is deposited using CVD, LPCVD, HDP-CVD, ALD, MOCVD, PVD, JVD, spin on, or other suitable deposition technique. Dielectric material 310 caps trench 302 and completely seals trench 302 if lifted portions 308 of nitride or oxynitride layer 304d do not completely seal the trench.

Figure 13:
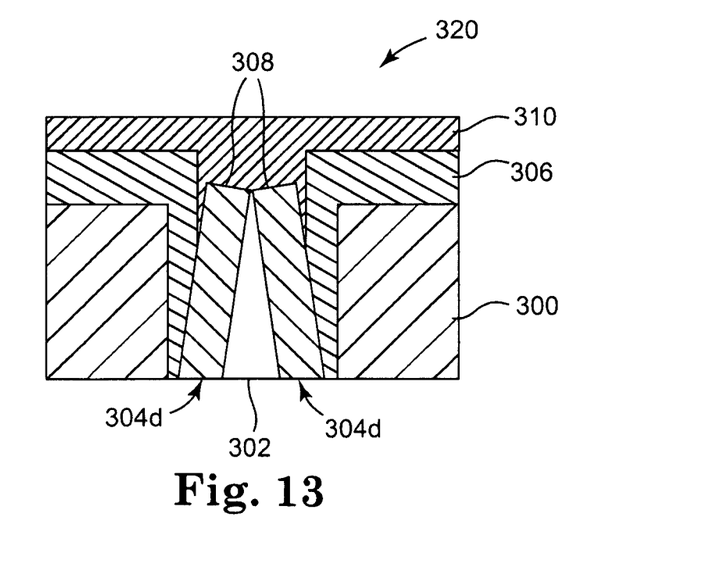
FIG. 13 is an image of one embodiment of a semiconductor substrate, a nitride or oxynitride layer, an oxide layer, and a dielectric layer.

FIG. 13 is an image 320 of one embodiment of a semiconductor substrate 300, a nitride or oxynitride layer 304d, an oxide layer 306, and a dielectric layer 310. In this embodiment, lifted portions 308 of nitride or oxynitride layer 304d narrow the opening of trench 302. In this embodiment, dielectric layer 310 is an oxide deposited over oxide 306 formed by thermal oxidation. Dielectric layer 310 caps trench 302 to provide a cavity. In one embodiment, the cavity includes air or another suitable gas and is used for the fabrication of a pressure sensor. In another embodiment, the cavity includes a vacuum and is used for the fabrication of a pressure sensor or for electrical isolation in a semiconductor device.

Embodiments provide sealed cavities within semiconductor substrates for use in pressure sensors or in other suitable devices, such as for electrical isolation within a semiconductor device. Embodiments of the sealed cavities are formed using a thermal oxidation process to lift off upper portions of a nitride or oxynitride layer deposited on the sidewalls of a trench. The lifted off portions of the nitride or oxynitride layer seal or narrow the opening to the trench for forming a cavity within the semiconductor substrate.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A semiconductor device comprising:
a substrate comprising a cavity;
a single material layer directly contacting at least a portion of sidewalls of the cavity; and
an oxide layer directly contacting and separating a top portion of the sidewalls of the cavity and each of top portions of the single material layer which pushes the top portions of the single material layer toward each other to substantially enclose the cavity.

2. The semiconductor device of claim 1, wherein the single material layer directly contacts a bottom of the cavity.

3. The semiconductor device of claim 1, wherein the top portions of the single material layer seal the cavity.

4. The semiconductor device of claim 1, further comprising:
a dielectric layer over the oxide layer and the top portions of the single material layer.

5. The semiconductor device of claim 1, wherein the substrate comprises a silicon substrate.

6. The semiconductor device of claim 1, wherein the semiconductor device comprises a pressure sensor.

7. The semiconductor device of claim 1, wherein the cavity provides electrical isolation within the semiconductor device.

8. A semiconductor device comprising:
a substrate comprising a cavity;
a single material layer directly contacting at least a portion of sidewalls of the cavity; and
an oxide layer over the substrate and directly contacting at least a portion of the sidewalls of the cavity such that the oxide layer lifts off a top portion of the single material layer toward a center of the cavity,
wherein the single material layer comprises one of nitride and oxynitride.

9. A semiconductor device comprising:
a substrate comprising a trench;
a single material layer directly contacting at least a portion of sidewalls of the trench, the single material layer comprising portions separated from the sidewalls of the trench by an oxide layer and pushed toward each other to substantially enclose the trench; and
the oxide layer directly contacting at least a top portion of the sidewalls of the trench.

10. The semiconductor device of claim 9, wherein the single material layer directly contacts a bottom of the trench.

11. The semiconductor device of claim 9, further comprising:
a dielectric layer over the oxide layer and the portions of the single material layer.

12. The semiconductor device of claim 9, wherein the trench is sealed and comprises a vacuum.

13. A semiconductor device comprising:
a substrate comprising a trench;
a single material layer directly contacting at least a portion of sidewalls of the trench, the single material layer comprising a portion lifted from the sidewalls of the trench and extending toward a center of the trench; and
an oxide layer over the substrate and directly contacting at least a top portion of the sidewalls of the trench,
wherein the single material layer comprises one of nitride and oxynitride.

14. A semiconductor device comprising:
a first cavity within a semiconductor substrate;
a single material layer directly contacting at least a portion of sidewalls of the first cavity, the single material layer comprising top portions separated from the sidewalls of the cavity by an oxide layer and pushed toward each other to substantially enclose the cavity;
a second cavity within the semiconductor substrate, the second cavity open to an atmosphere and defining a lamella between the first cavity and the second cavity; and
a sensor element configured for sensing a pressure on the lamella.

15. The semiconductor device of claim 14, wherein the sensor element comprises a capacitive element.

16. The semiconductor device of claim 14, wherein the sensor element comprises a transistor.

17. The semiconductor device of claim 14, wherein the sensor element comprises a piezo resistor.

18. The semiconductor device of claim 14, wherein the single material layer directly contacts a bottom of the first cavity.

19. The semiconductor device of claim 14, wherein the single material layer comprises one of nitride and oxynitride.

20. A semiconductor device comprising:
a first cavity oriented vertically within a semiconductor substrate;
a single material layer directly contacting at least a portion of sidewalls of the first cavity, the single material layer comprising top portions separated from the sidewalls of the cavity by an oxide layer and pushed toward each other to substantially enclose the cavity;
a second cavity oriented vertically within the semiconductor substrate and parallel to the first cavity, the second cavity open to an atmosphere on a first side of the semiconductor substrate and defining a lamella between the first cavity and the second cavity; and
a sensor element configured for sensing a pressure on the lamella.

21. The semiconductor device of claim 20, wherein the sensor element comprises a capacitive element on a sidewall of one of the first cavity and the second cavity.

22. The semiconductor device of claim 20, wherein the sensor element comprises a transistor on a second side of the semiconductor substrate opposite the first side.

23. The semiconductor device of claim 20, wherein the sensor element comprises a piezo resistor on a second side of the semiconductor substrate opposite the first side.

24. The semiconductor device of claim 20, wherein the top portions of the single material layer seal the cavity.

25. The semiconductor device of claim 20, wherein the single material layer directly contacts a bottom of the first cavity.

\* \* \* \* \*